(12) United States Patent  (10) Patent No.: US 9,300,163 B2
Cern                      (45) Date of Patent:    Mar. 29, 2016

(54) WIRELESS POWER TRANSFER VIA VARIABLE COUPLING CAPACITANCE

(71) Applicant: Ambient Corporation, Newton, MA (US)

(72) Inventor: Yehuda Cern, Efrat (IL)

(73) Assignee: ERICSSON INC., Plano, TX (US)

( * ) Notice: Subject to any disclaimer, the term of this patent is extended or adjusted under 35 U.S.C. 154(b) by 194 days.

(21) Appl. No.: 14/211,716

(22) Filed: Mar. 14, 2014

(65) Prior Publication Data

US 2014/0266035 A1    Sep. 18, 2014

Related U.S. Application Data

(60) Provisional application No. 61/791,677, filed on Mar. 15, 2013.

(51) Int. Cl.
*H01M 10/46* (2006.01)
*H02J 7/02* (2006.01)
*H02J 17/00* (2006.01)

(52) U.S. Cl.
CPC *H02J 7/025* (2013.01); *H02J 17/00* (2013.01)

(58) Field of Classification Search
CPC ........... H02J 5/005; H02J 7/025; H02J 7/355; H02J 7/0042; H02J 7/0045
USPC .................... 320/107, 108, 114, 115; 323/355
See application file for complete search history.

(56) References Cited

U.S. PATENT DOCUMENTS

| 4,238,799 | A | 12/1980 | Parfitt |
| 4,480,178 | A | 10/1984 | Miller et al. |
| 5,175,418 | A | 12/1992 | Tanaka |
| 5,654,693 | A | 8/1997 | Cocita |
| 5,854,480 | A | 12/1998 | Noto |
| 6,001,211 | A | 12/1999 | Noto |
| 6,040,773 | A | 3/2000 | Vega et al. |
| 6,147,605 | A | 11/2000 | Vega et al. |
| 6,211,799 | B1 | 4/2001 | Post et al. |
| 6,229,442 | B1 | 5/2001 | Rolin |
| 6,236,316 | B1 | 5/2001 | Eberhardt et al. |
| 6,252,508 | B1 | 6/2001 | Vega et al. |
| 6,282,407 | B1 | 8/2001 | Vega et al. |
| 6,879,809 | B1 | 4/2005 | Vega et al. |
| 7,525,283 | B2 | 4/2009 | Cheng et al. |
| 7,571,853 | B2 | 8/2009 | Banglin et al. |
| 2007/0222426 | A1* | 9/2007 | Waffenschmidt et al. .... 323/355 |
| 2012/0002446 | A1 | 1/2012 | Madawala |
| 2014/0241555 | A1* | 8/2014 | Terlizzi ........................ 320/108 |

FOREIGN PATENT DOCUMENTS

WO    03096361    11/2003
WO    2012078055   6/2012

OTHER PUBLICATIONS

Liu, Chao et al, 2010, IEEE, A Generalized Coupling Model for Capacitive Power Transfer Systems, pp. 274-279.
International Search Report dated Jul. 17, 2014 corresponding to International Patent Application No. PCT/US2014/027867; 3 pages.
Written Opinion dated Jul. 17, 2014 corresponding to International Patent Application No. PCT/US2014/027867; 4 pages.

* cited by examiner

*Primary Examiner* — Edward Tso (57) ABSTRACT

There is provided a system that includes a charger and a portable device. The portable device is coupled to the charger via a coupling capacitance. The charger provides a relatively constant current to the portable device, even for a relatively large variation in the coupling capacitance.

5 Claims, 12 Drawing Sheets

Table 1. Design Example

| Design Values | | | Calculated parameters | | |
|---|---|---|---|---|---|
| Source voltage | 5 | V rms | | | |
| Load current | 50 | mA | | | |
| Source frequency | 13.56 | MHz | | | |
| Load resistance, $R_L$ | 200 | Ω | | | |
| Capacitor, Cs | 130 | pF | Xs | 90.1 | Ω |
| Inductor, Lp | 1.00 | uH | Xp | 84.8 | Ω |
| | | | Xp-Xs | -5.3 | Ω |
| | | | $\lambda \equiv Xs/Xp$ | 1.062 | |
| | | | Resonant freq. Cs & Lp | 13.974 | MHz |
| | | | Offset from resonant freq. | 3.05% | |
| Q of Lp | 50 | | Rp = Loss resistance of Lp | 1.7 | Ω |
| Source resistance, Rs | 5 | Ω | Rs+Rp | 6.7 | Ω |
| Inductance, Lcc | 12 | uH | $X_{Lcc}$ | 1022 | Ω |
| Nominal coupling capacitance, Cc | 10 | pF | Nominal $X_{Cc}$ | 1174 | Ω |
| Minimal coupling capacitance | 5.8 | pF | Minimum $X_{Cc}$ | 2024 | Ω |
| | | | Thevenin equivalent source voltage | 49.8 | V rms |
| | | | Re[Zth] | 686 | Ω |
| | | | Im[Zth] | 554 | Ω |
| | | | Thevenin equivalent impedance magnitude | 882 | Ω |
| | | | Nominal load current | 51 | mA |
| | | | Load current Cc(min) | 50 | mA |
| | | | Max load current | 56 | mA |

FIG. 12

WIRELESS POWER TRANSFER VIA VARIABLE COUPLING CAPACITANCE

BACKGROUND OF THE DISCLOSURE

1. Field of the Invention

The present invention relates to wireless power transfer.

2. Description of the Related Art

Wireless power transfer between fixed and portable devices eliminates power connectors and concomitant issues of contact cleanliness, dirty and wet environments and shock hazard. Often connectors are the least reliable component in electronic systems.

Wireless power transfer has been adopted for charging portable battery-powered devices such as cell phones and motorized toothbrushes. The portable device may be a wireless integrated circuit card and the fixed device may be a card coupling device. Alternatively, the portable device may be a mobile telephone, smart phone or computer tablet and the fixed device may be a battery charger. In the present disclosure, chargers are representative of a wider class of fixed devices.

For example, the Qi standard developed by the Wireless Power Consortium has been adopted by many companies for inductive wireless power transfer. One disadvantage of inductive power transfer is the need to contain a relatively strong magnetic field by means of shielding in both the charger and portable device, increasing costs. With people in close proximity to the charger, such shielding is required to limit the magnetic field strength to a permissible level.

SUMMARY OF THE DISCLOSURE

There is provided a system that includes a charger and a portable device. The portable device is coupled to the charger via a coupling capacitance. The charger provides a relatively constant current to the portable device, even for a relatively large variation in the coupling capacitance.

The charger includes a source, a first reactive component, and a second reactive component. The source provides alternating current at a source frequency (fs), and has a first terminal and a second terminal, and a source impedance. The first reactive component is connected between the first terminal and an interim point. The second reactive component is connected between the interim point and the second terminal. One of the first reactive component and the second reactive component is a capacitor, and the other of the first reactive component and the second reactive component is a first inductor. The first reactive component, the second reactive component, and the source impedance, in combination, have a Thévenin equivalent impedance. The first inductor and the capacitor have a resonant frequency that is different from the source frequency. The charger also includes a first plate, a second inductor, and a second plate. The first plate is electrically conductive. The second inductor is connected between the interim point and the first plate. The second plate is electrically conductive and is connected to the second terminal.

The portable device has a third plate, a fourth plate, and an electrical load resistance. The third plate faces the first plate, and is electrically conductive and thus forms a first capacitance between the third plate and the first plate. The fourth plate faces the second plate, and is electrically conductive and thus forms a second capacitance between the second plate and the fourth plate. The electrical load resistance is connected between the third plate and fourth plate.

The first and second capacitances, together, have an equivalent series capacitance. The equivalent series capacitance has a value in a range between an initial value and 60% of the initial value. The Thévenin equivalent impedance has a positive imaginary component, and a magnitude that is at least three times greater than the load resistance. The second inductor has a reactance approximately equal to a reactance of the initial value of the equivalent series capacitance.

The charger provides a current to the electrical load resistance that varies less than about 10% over the range of the equivalent series capacitance.

Communicated data may include information concerning a presence of a portable device and initiation of charging. Other data may include a charge state of a battery in a portable device, an indication to the charger as to when to decrease or turn off the charging current.

DESCRIPTION OF THE DISCLOSURE

The present disclosure proposes a capacitive charging interface, whereby a charger has a pair of insulated conductive plates, also referred to herein as charger plates. A portable device with a pair of insulated conductive plates of a layout that corresponds to that of the charger plates is placed opposite the charger plates, forming two coupling capacitors that connect the charger to the portable device. The capacitance of these coupling capacitors may vary due to surface contamination and inaccurate placement of the portable device on the charger. The present disclosure describes a charging interface that provides power transfer that is relatively unaffected by coupling capacitance variations.

When each of the pair of charger plates is driven by equal amplitude, opposite phase voltages, substantial cancellation of external fields is affected. By surrounding the pairs of plates with a grounded ring, an electric field is further shielded and attenuated. It is shown herein that with a relatively small capacitance in each of the two capacitors thus formed, a substantial flow of power may be attained.

One challenge for capacitive coupling is maintaining power flow, even when the surface of the charger and/or portable device has a layer of dirt. Such a layer would widen a gap between the plates and reduce the capacitance. The present disclosure proposes a circuit that provides a substantially constant current, despite wide variations in coupling capacitance.

Bi-directional communications could be implemented between fixed and portable devices, using amplitude modulation in the charger and load modulation in the portable device. Similarly, other modulation schemes may be implemented. Communicated data may include information concerning a presence of a portable device and initiation of charging. Other data may include a charge state of a battery in a portable device, an indication to the charger as to when to decrease or turn off the charging current.

Figure 1:
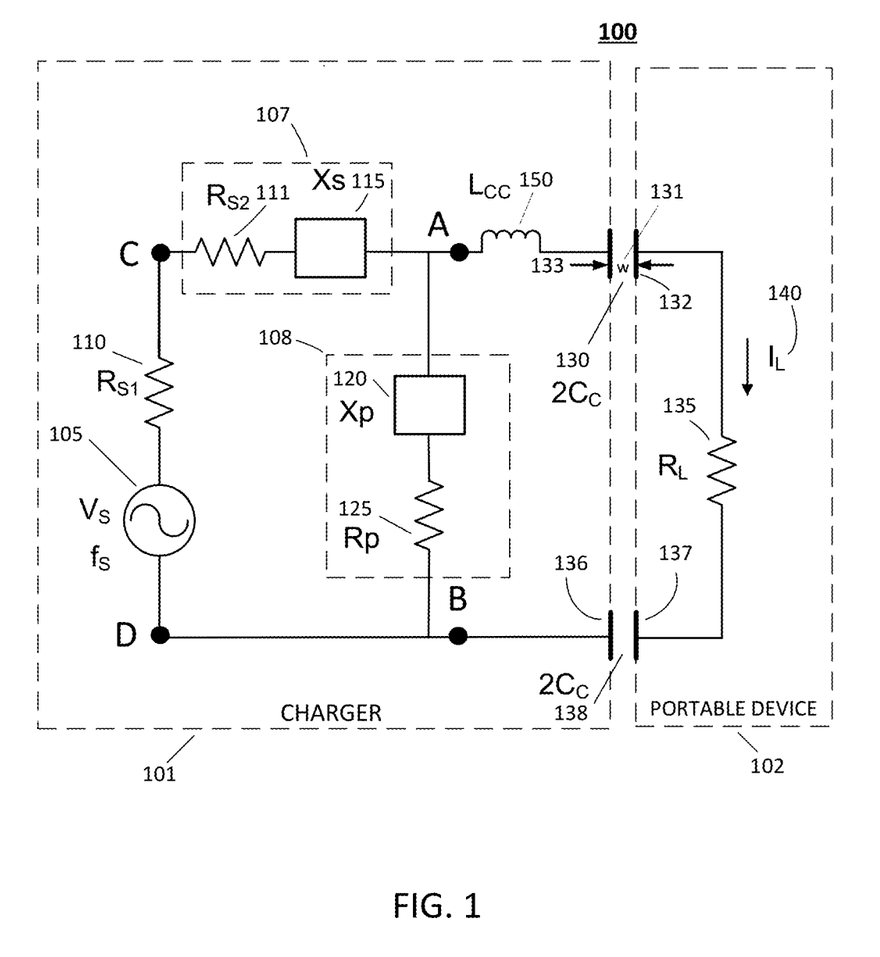
FIG. 1 is a schematic diagram of a circuit that employs wireless power transfer via a variable coupling capacitance.

FIG. 1 is a schematic diagram of a circuit 100 that employs wireless power transfer via a variable coupling capacitance. Electrical power is transferred from a charger 101 to a portable device 102. Portable device 102 may be, for example, a cellphone or portable computing device, and charger 101 may be a battery charger.

Direct current (DC) power is available to portable device 102 and its load, as represented by a load resistance $R_L$ 135, from an AC power source 105 of a source frequency fs having an internal resistance $Rs_1$ 110, a first terminal C and a second terminal D.

In a typical embodiment, $R_L$ 135 represents a load resistance of a rectifier, a voltage or current regulator, and an energy storage device, e.g., a battery, that is capable of being recharged. A current $I_L$ 140 is supplied to $R_L$ 135.

A source voltage Vs is applied to a series resonant circuit comprising a series reactive component 107 connected between first terminal C and an interim point A. A parallel reactive component 108 is connected between interim point A and terminal D. In one embodiment, reactive component 107 is a capacitor, and reactive component 108 is an inductor. In an alternative embodiment, reactive component 107 is an inductor, and reactive component 108 is a capacitor. The capacitor and the inductor form a series resonant circuit having a resonant frequency that is intentionally offset from source frequency fs by up to 5%, resulting in a voltage between terminals A and B that is in a range of approximately three to ten times the amplitude of Vs.

Source voltage Vs is illustrated as a sine wave generator, but it may also represent the fundamental frequency component of an output of a non-sinusoidal source, such as a square wave.

Reactive components may have losses. Reactive component 107 has a reactance Xs 115 and a resistance $Rs_2$ 111. Reactive component 108 has a reactance Xp 120 and a resistance Rp 125.

Charger 101 has a plate 131, and a plate 136 that are electrically conductive. An inductor Lcc 150 is connected between interim point A and plate 131. Plate 136 is connected to points B and D.

Portable device 102 has a plate 132 that faces plate 131. Plate 132 is electrically conductive and thus forms a capacitance 2Cc 130 between plate 132 and plate 131. Portable device 102 also has a plate 137 that faces plate 136. Plate 137 is electrically conductive and thus forms a capacitance 2Cc 138 between plate 136 and plate 137.

Ideally, plate 131 and plate 132 are perfectly aligned opposite each other, and similarly plate 136 and plate 137 are perfectly aligned. In practice, a degree of misalignment may occur. A gap 133 having a width "w" between plates 131 and 132 may include varying combinations of insulating packaging materials, air and contamination. A similar gap exists between plates 136 and 137.

Charger 101 is thus capacitively coupled to portable device 102 via capacitance 2Cc 130 and capacitance 2Cc 138. Capacitances 130 and 138 together have an equivalent series capacitance Cc. For the case of perfect alignment of plates 131 and 132 opposite plates 136 and 137, and no contamination increasing the width of gap 133, Cc has a maximal initial value, for example 10 pF. In practice, misalignment and surface contaminants may decrease Cc to a lower value, for example 60% of its initial value, for example 6 pF.

Capacitive reactance is given by the formula $$X=1/(2\pi fC).$$

Figure 2:
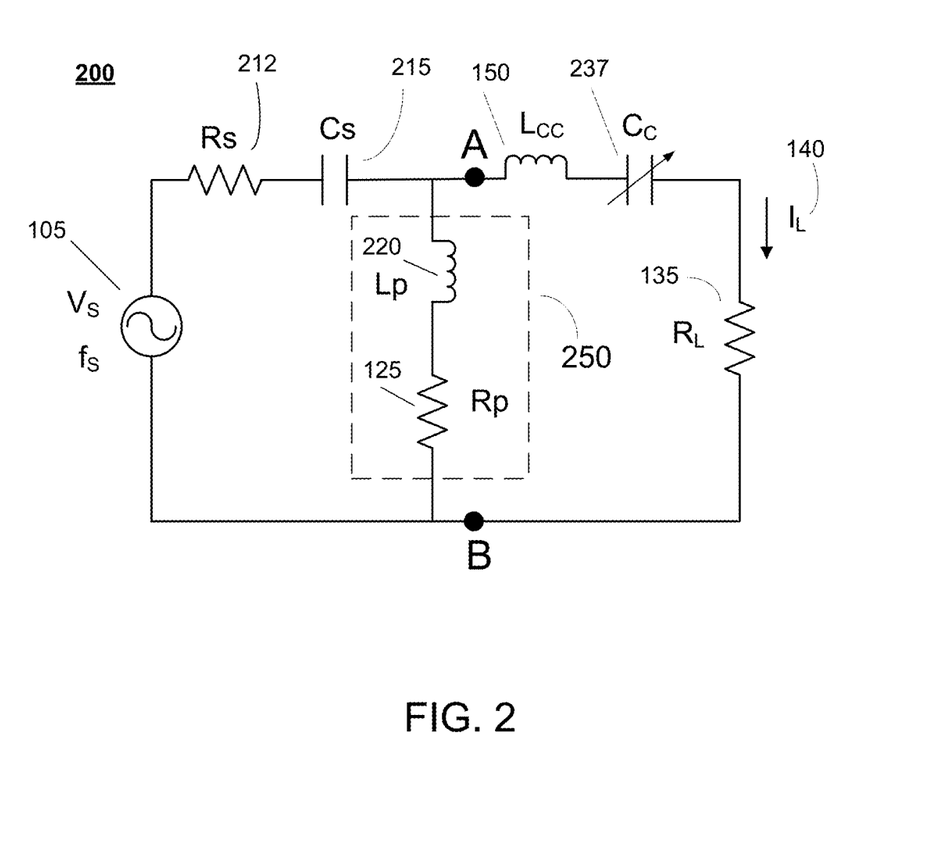
FIG. 2 is a schematic diagram of a circuit in a particular embodiment of the circuit of FIG. 1.

FIG. 2 is a schematic diagram of a circuit 200 in a particular embodiment of the circuit of FIG. 1, where capacitances 130 and 138 are represented by a single variable capacitance Cc 237. In this embodiment, reactive component 107 is a capacitor Cs 215, and reactive component 108 is an inductor 250.

Loss resistance $Rs_2$ 111 of component 107 has been lumped together with source resistance $Rs_1$ 110, and are together represented by their sum, resistance Rs 212. Inductor 250 has a inductance Lp 220 and a resistance Rp 125.

In general, Cc 237 has a small capacitance, in the range of several picofarads, and therefore has a large negative imaginary impedance. Inductor Lcc 150 is in series with Cc 237. Inductor Lcc 150 has a positive imaginary impedance similar in magnitude to the impedance of Cc 237. The series combination of Cc 237 and Lcc 150 has an impedance magnitude that is much lower than that of Cc 237 alone. A value of Lcc 150 is selected to provide a reactance that is approximately equal to an initial value of the reactance of Cc 237, which is in turn equal to an initial value of the reactance of the equivalent series capacitance of capacitances 130 and 138.

For a given frequency $f_S$, $R_S$ 212, Rp 125 and $R_L$ 135, there exists a certain combination of $C_S$ 215 and $L_P$ 220 for which a relatively constant current will be provided to load $R_L$ 135 despite changes of $C_c$ 237 over a wide range of values.

For an electrical circuit in general, Thévenin's Theorem holds that any contiguous subsection of a circuit that connects to a remainder of that circuit by exactly two terminals can be represented by a Thévenin equivalent circuit. The Thévenin equivalent circuit comprises a voltage source in series with a Thévenin equivalent impedance. A Thévenin equivalent voltage is determined by isolating the circuit subsection from the remainder circuit, and measuring or calculating an open circuit voltage, for example, in circuit 200, between terminals A and B. The Thévenin equivalent impedance is determined by zeroing the values of all voltage and currents sources, shorting the voltage sources and opening the current sources, and measuring or calculating the impedance between the above-mentioned two terminals.

Figure 3:
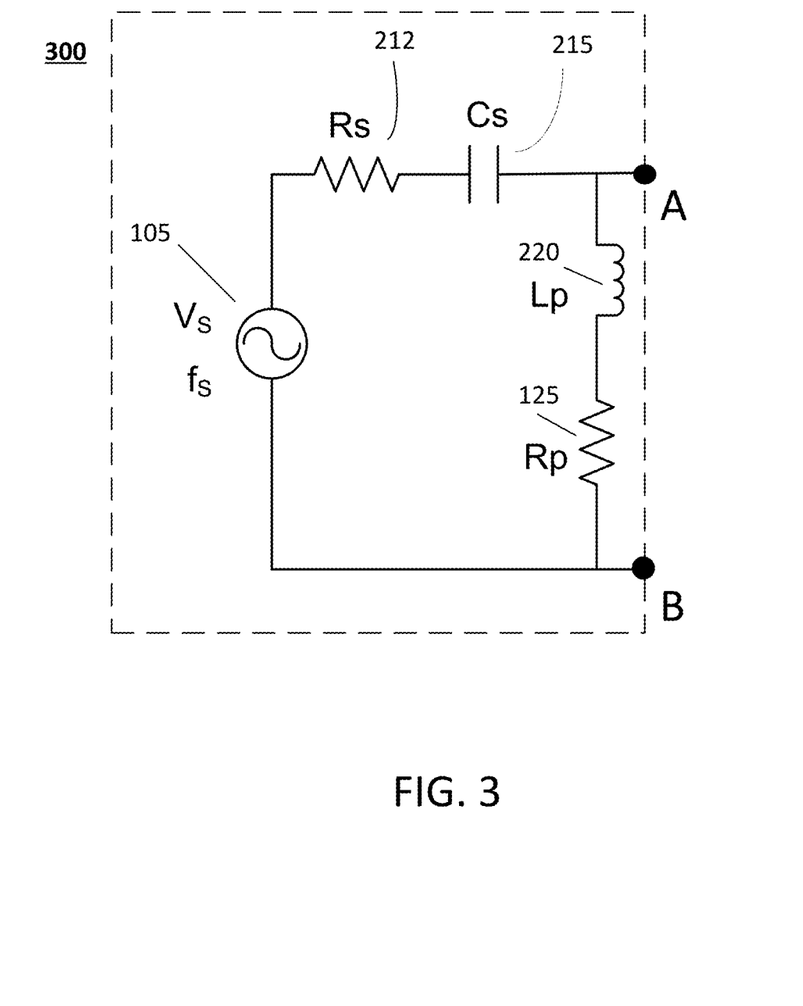
FIG. 3 is a schematic diagram of a sub-circuit of FIG. 2.

FIG. 3 is a schematic of a sub-circuit 300 comprising all of the components to the left of terminals A and B in FIG. 2.

Figure 4:
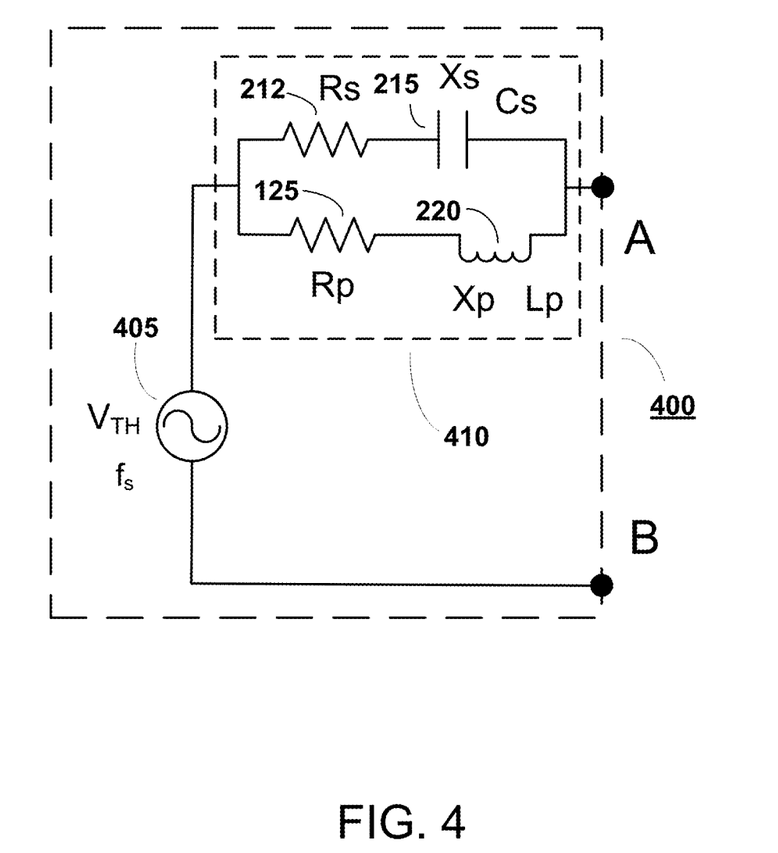
FIG. 4 is a schematic diagram of a circuit that is a Thévenin equivalent of the sub-circuit of FIG. 3.

FIG. 4 is a schematic diagram of a circuit 400 that is a Thévenin equivalent of sub-circuit 300. $V_{TH}$ 405 represents the open circuit voltage between terminals A and B. A network 410 is configured with Rs 212, Cs 215, Rp 125 and Lp 220, and represents the impedance seen between terminals A and B in sub-circuit 300 when AC power source 105 is replaced by a short circuit.

Circuit analysis calculations are now provided. The value of Thévenin equivalent voltage source $V_{TH}$ 405 is calculated from the voltage divider equation. The Thévenin equivalent impedance is the combined impedance of Rs 212, Cs 215, Rp 125 and Lp 220 as connected in circuit 400, and the Thévenin equivalent voltage, i.e., the voltage between terminals A and B, is taken across inductor 250 comprising, Lp 220 and Rp 125, in sub-circuit 300.

$$V_{TH} = V_S(R_P + jX_P)/[(R_P + R_S) + j(X_P - X_S)] \quad \text{(EQU 1)}$$

Multiplying by the complex conjugate of the denominator, $$V_{TH} = \frac{V_S \begin{bmatrix} R_P(R_P + R_S) + X_P(X_P - X_S) + \\ j[X_P(R_P + R_S) - R_P(X_P - X_S)] \end{bmatrix}}{(R_P + R_S)^2 + (X_P - X_S)^2} \quad \text{(EQU 2)}$$

For a typical case where source resistance and loss resistances have much lower values than the reactances, such that Rs<<Xs and Rp<<Xp, $V_{TH}$ is approximately $$V_{TH} \approx \frac{V_S[X_P(X_P - X_S) + j[X_P(R_P + R_S) - R_P(X_P - X_S)]]}{(R_P + R_S)^2 + (X_P - X_S)^2} \quad \text{(EQU 3)}$$

The Thévenin equivalent source impedance $Z_{TH}$ is given by $$Z_{TH} = \frac{(R_S - jX_S)(R_P + jX_P)}{R_P + R_S + j(X_P - X_S)} \quad \text{(EQU 4)}$$

$$= \frac{R_S R_P + X_S X_P + j(R_S X_P - R_P X_S)}{R_P + R_S + j(X_P - X_S)} \quad \text{(EQU 4A)}$$

$$= \frac{R_S R_P(R_P + R_S) + R_S X_P^2 + R_P X_S^2 +}{(R_P + R_S)^2 + (X_P - X_S)^2} \quad \text{(EQU 4B)}$$
$$\frac{j[R_S^2 X_P - R_P^2 X_S - X_S X_P^2 + X_S^2 X_P]}{(R_P + R_S)^2 + (X_P - X_S)^2}$$

Employing the above approximations, namely Rs<<Xs and Rp<<Xp, the real part of $Z_{TH}$ is approximately $$\mathrm{Re}[Z_{TH}] \approx \frac{R_S X_P^2 + R_P X_S^2}{(R_P + R_S)^2 + (X_P - X_S)^2} \quad \text{(EQU 5)}$$

In comparison, the imaginary part of $Z_{TH}$ is approximately $$\mathrm{Im}[Z_{TH}] \approx \frac{X_S X_P (X_S - X_P)}{(R_P + R_S)^2 + (X_P - X_S)^2} \quad \text{(EQU 6)}$$

Figure 5:
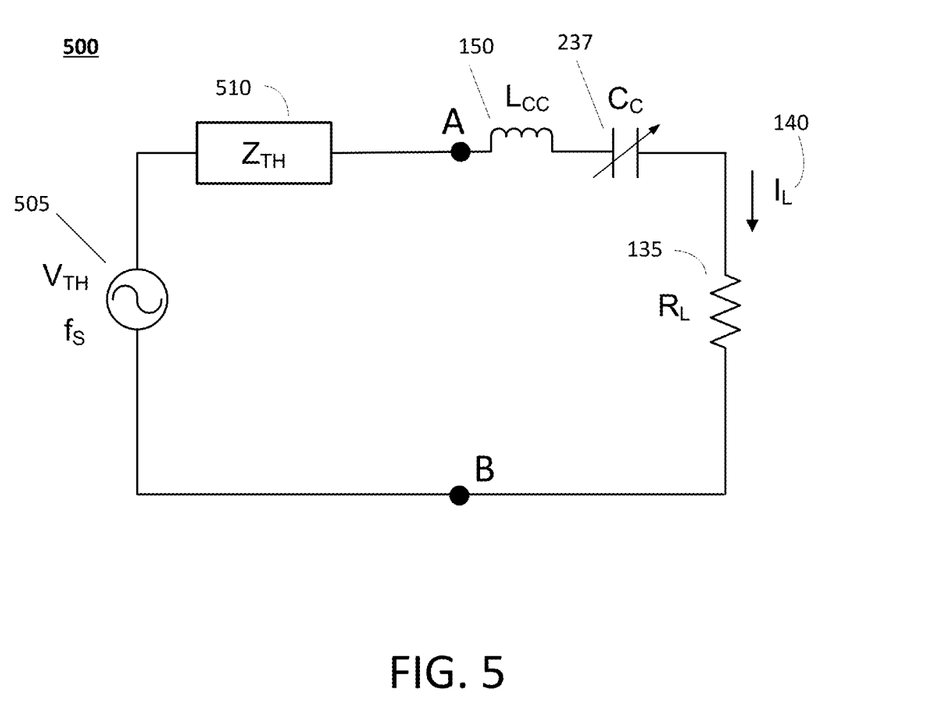
FIG. 5 is a schematic diagram of a circuit that is a Thévenin equivalent of the circuit of FIG. 2.

FIG. 5 is a schematic diagram of a circuit 500 that is a Thévenin equivalent of circuit 200. To form circuit 500, the portion of circuit 200 to the left of terminals A and B has been replaced by a Thévenin equivalent voltage source $V_{TH}$ 505 from EQU 3, and components in network 410 have been replaced by complex impedance $Z_{TH}$ 510, whose real and imaginary components are given by EQU 5 and EQU 6, respectively. Lcc 150, Cc 237 and $R_L$ 135 have been restored in circuit 500, and Thévenin's Theorem posits that $I_L$ 140 is the same as in circuits 100 and 200.

Between $V_{TH}$ 505 and $R_L$ 135 we define a total system impedance Zsys comprising the sum of $Z_{TH}$, the impedance of Lcc 150 and the impedance of Cc 237. Zsys is given by $$Zsys = V_{TH}/[Re[Z_{TH}] + j\{Im[Z_{TH}] + 2\pi fs\ Lcc - 1/(2\pi fs\ Cc)\}] \quad \text{(EQU 7)}$$

Figure 6A:
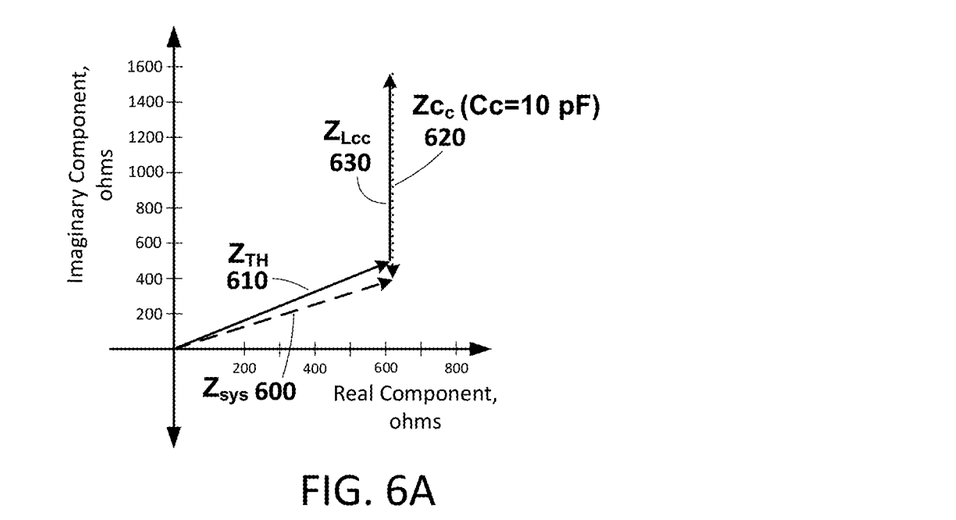
FIGS. 6A, 6B and 7 are phasor representations of various impedances of the circuit of FIG. 5.

FIG. 6A is a phasor diagram of all impedances in circuit 500 except for $R_L$ 135, for a case that Cc 237 is set to a maximum 10 picofarads (pF). Total impedance Zsys, represented by a phasor Zsys 600, is a sum of a phasor $Z_{TH}$ 610, a phasor $Z_{Lcc}$ 630 and a phasor $Z_{Cc}$ 620 where $Z_{TH}$ 610 is a phasor representation of the Thévenin equivalent source impedance, $Z_{Lcc}$ 630 is a phasor representation of the impedance of Lcc 150, and $Z_{Cc}$ 620 is the phasor representation of the impedance of Cc 237. By selecting a value for the impedance of Lcc 150 to be similar in magnitude to that of a maximum coupling capacitance for Cc 237, $Z_{Lcc}$ 630 cancels $Z_{Cc}$ 620. As a result, Zsys 600 is very similar in length to $Z_{TH}$ 610.

Figure 6B:
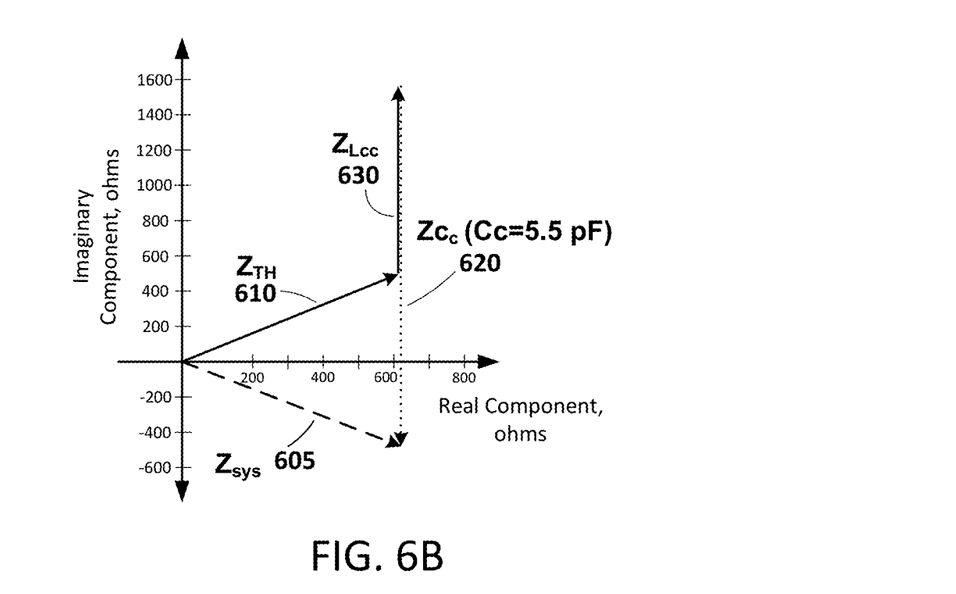

FIG. 6B is a phasor diagram, similar to that of FIG. 6A, but for a minimal coupling capacitance for Cc 237 of 5.5 pF. $Z_{Cc}$ 620 has correspondingly increased length, and Zsys, as represented by a phasor Zsys 605, is thereby rotated clockwise past the real axis and has a negative imaginary component. However, the length $|Z_{sys}|$ of Zsys 605 has remained about the same as that of Zsys 600, and both are similar in length to $|Z_{TH}|$. This illustrates that the magnitude of system impedance Zsys has not increased, despite the reduction of the capacitance of Cc 237 from 10 pF to 5.5 pF, and that length $|Z_{sys}| \approx |Z_{TH}|$.

In a preferred embodiment, Thévenin equivalent impedance $Z_{TH}$ has a positive imaginary component, and a magnitude that is at least three times greater than load resistance $R_L$ 135.

Figure 7:
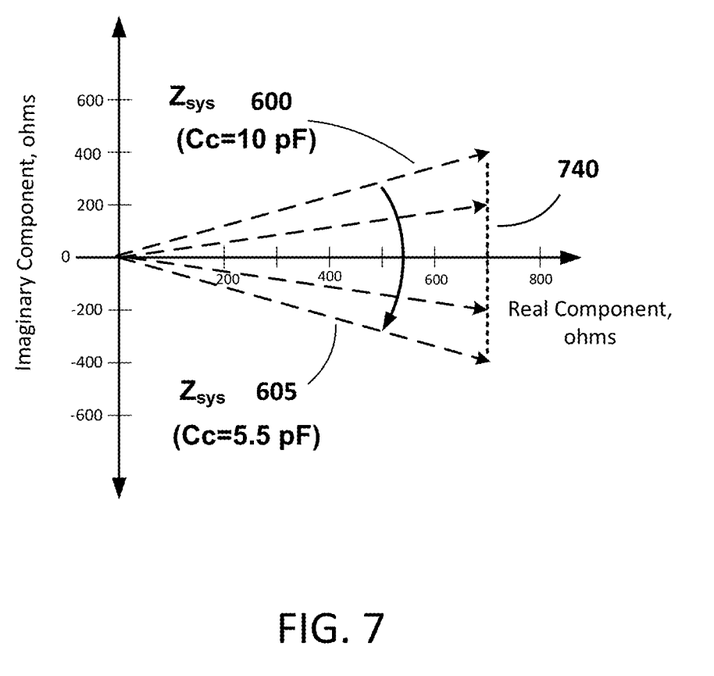

FIG. 7 is a phasor diagram that shows a locus 740 of termination points of Zsys as it rotates clockwise from Zsys 600 as a result of decreasing values of Cc 237 until Cc 237 reaches a design minimum at position of Zsys 605.

A Thévenin current source value $I_{TH}$ may be calculated by dividing EQU 1 by EQU 4, $$I_{TH} = V_{TH}/Z_{TH} = V_S/(R_S - jX_S) \quad \text{(EQU 8)}$$

Typically Rs<<Xs. So the magnitude of $|I_{TH}|$ is approximately $$|I_{TH}| \approx V_S/X_S = V_S(2\pi fs\ Cs) \quad \text{(EQU 9)}$$

Current $|I_{TH}|$ approximates the load current $I_L$ 140 for the conditions $R_L << |Z_{TH}|$ and the reactances of Lcc 150 and Cc 237 approximately cancel each other.

For a design goal of a particular load current $I_L$ and source frequency fs, components Cs 215, Lp 220 and Lcc 150 can be chosen according to the formulae $$Cs \approx 1.1 I_L/(2\pi fs\ V_S), \quad \text{(EQU 10)}$$

where a factor of 1.1 somewhat compensates for the reduction of load current due to the non-negligible value of load resistance $R_L$, and $$Lp \approx 0.94/(4\pi^2 f^2 Cs), \quad \text{(EQU 11)}$$

where a factor of 0.94 increases the resonant frequency of Cs and Lp 220 by about 3% relative to source frequency fs, to achieve a positive imaginary component of $Z_{TH}$ and to achieve a range of Cc providing relatively constant load current, as shown in FIG. 7. For all load currents and initial value $C_{c(initial)}$ of the equivalent series capacitance Cc, Lcc will cancel most of the reactance of Cc when set to approximately $$Lcc \approx 1/(4\pi^2 f^2 C_{c(initial)}), \quad \text{(EQU 12)}$$

but adjusting Lcc to slightly higher or lower values may be advantageous, to skew a range of capacitances that meet or exceed the desired load current.

A feature of the technique disclosed herein is the increase in voltage afforded by the series resonant LC circuit of reactive components 107 and 108, allowing relatively small coupling capacitances represented by Cc 237 to conduct a relatively large load current. To illustrate, for a source frequency fs of 13.56 MHz, a reduced equivalent series equivalent capacitance of 5.5 pF has a 2.1 k ohm reactance. A 5 volt root-mean-square (rms) voltage source would drive less than 2.5 mA through a 200 ohm load, or about 1.25 milliwatts. The currently proposed circuit drives about 50 mA through the load, or about 500 milliwatts.

Figure 12:
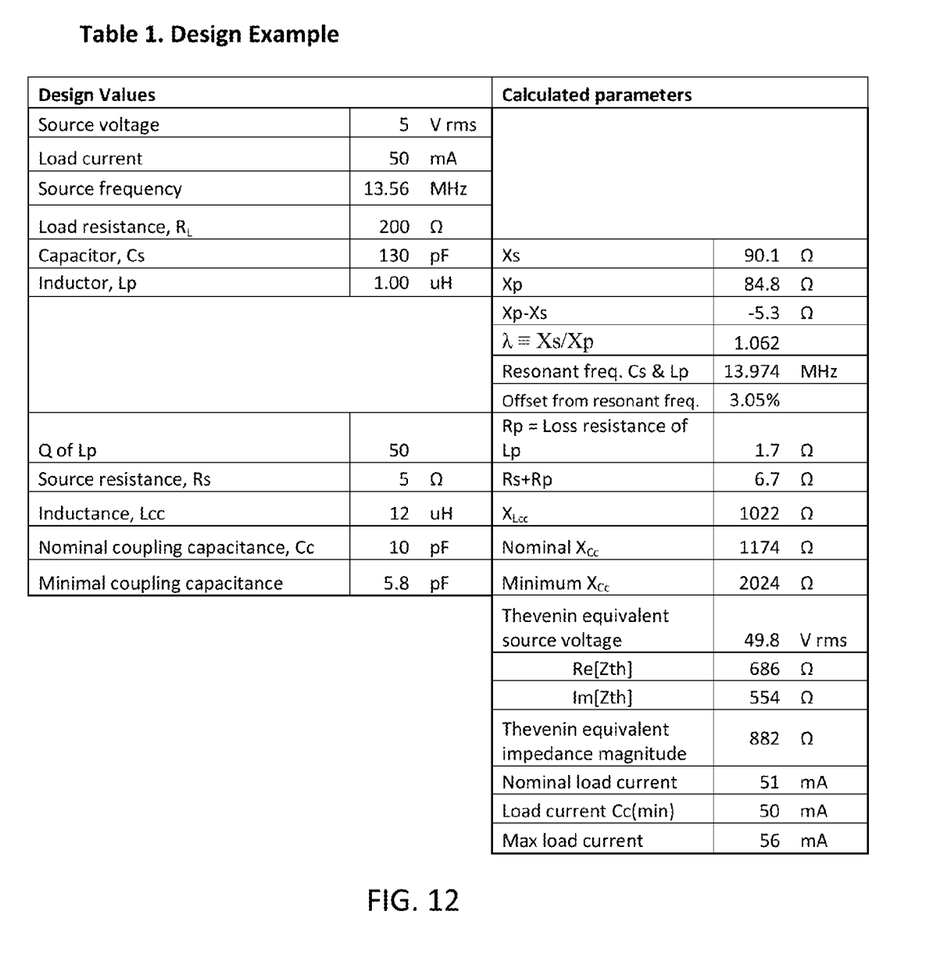
FIG. 12 is a table that lists values for an exemplary design of a circuit in accordance with the present disclosure.

FIG. 12 is a table, i.e., Table 1, that lists values for an exemplary design of a circuit in accordance with the present disclosure.

Table 1 shows a design example, for a source voltage Vs of 5 volts rms with source resistance of 5 ohms, a load resistance $R_L$ of 200 ohms, a source frequency fs of 13.56 MHz, a nominal series equivalent capacitance Cc 237 of 10 pF and a desired load current $I_L$ of 50 mA. Capacitor Cs 215 is selected according to EQU 10 as 130 pF, and the inductance Lp 220 of inductor 250 is selected according to EQU 11 as 1.0 microhenries (pH). Commercially available inductors such as the TDK MLF1005G1R0KT show a Q of 70 in the region of 13 MHz, so Table 1 specifies a conservative Q of 50.

Inductor Lcc 150 is set to 12 uH, about 10% less than would be calculated from EQU 12. Its Q is not critical, as its small loss resistance is in series with the load. An example of a suitable commercially available inductor is a Delevan 5022R-123J.

The right column of Table 1 tabulates calculated values for parameters calculated above. Calculations show that coupling capacitance can be decreased to as low as 5.8 pF, a 42% reduction below the nominal series equivalent capacitance of 10 pF, yet load current is maintained and does not decrease below 50 mA. The right column of Table 1 also shows a Thévenin equivalent source voltage $V_{TH}$ of 49.8 volts rms, or about ten times higher than the 5 volt rms source voltage Vs. The Thévenin equivalent impedance magnitude $|Z_{TH}|$ is 882 ohms, more than four times higher than the load impedance $R_L$ of 200 ohms, helping to explain why current remains relatively constant over a range of load resistances and series equivalent capacitances.

Figure 8:
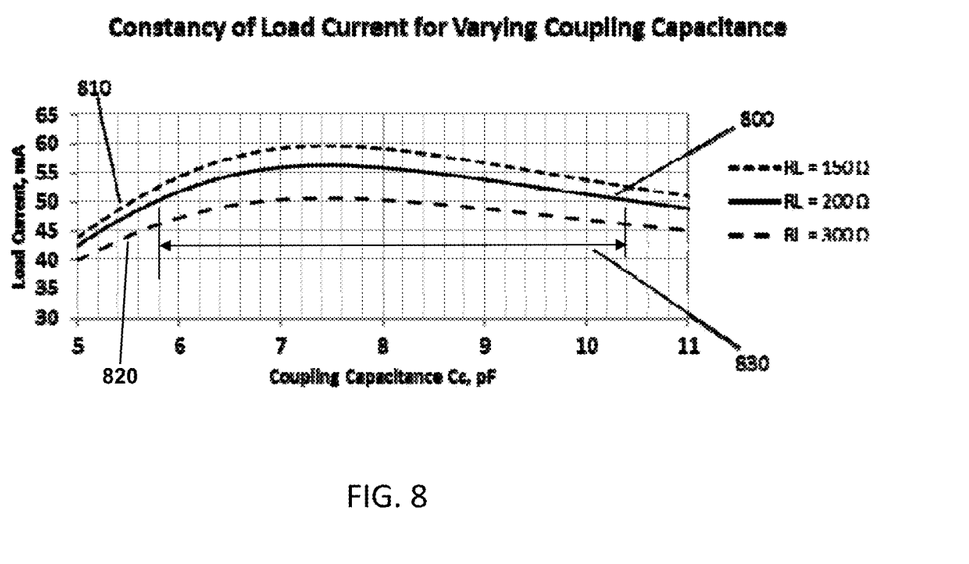
FIG. 8 is a graph of output current $I_L$ vs. coupling capacitance $C_S$ for the circuit of FIG. 3.

The series equivalent capacitance Cc 237 may be considered a coupling capacitance. FIG. 8 is a graph of output current $I_L$ vs. coupling capacitance $C_S$ for the circuit of FIG. 3, and shows the constancy of load current $I_L$ over a wide range of coupling capacitances. A solid curve 800 shows load current varying between 50 mA and 56 mA for a variation of coupling capacitance over a range indicated by a line 830 between 5.8 pF and 10.4 pF. A curve 810 shows that load current $I_L$ varies relatively little for a load resistance of 150 ohms, and a curve 820 shows that load current $I_L$ varies relatively little for a load resistance of 300 ohms.

In review, charger 101 includes AC power source 105, a reactive component 107, and reactive component 108. AC power source 105 provides alternating current at a source frequency (fs), and has a terminal (C) and a terminal (D), and a source impedance $Rs_1$ 110. Reactive component 107 is connected between terminal (C) and an interim point (A). Reactive component 108 is connected between interim point (A) and terminal (D). One of reactive component 107 and reactive component 108 is a capacitor, and the other of reactive component 107 and reactive component 108 is a first inductor. Reactive component 107, reactive component 108, and source impedance $Rs_1$ 110, in combination, have a Thévenin equivalent impedance. The first inductor and the capacitor have a resonant frequency that is different from the source frequency. Charger 101 also includes a plate 131, a second inductor 150, and a plate 136. Plate 131 is electrically conductive. Inductor 150 is connected between interim point (A) and plate 131. Plate 136 is electrically conductive and is connected to terminal (D).

The portable device 102 has a plate 132, a plate 137, and an electrical load resistance $R_L$ 135. Plate 132 faces plate 131, and is electrically conductive and thus forms a capacitance 130 between plate 132 and plate 131. Plate 137 faces said plate 136, and is electrically conductive and thus forms a capacitance 138 between plate 136 and plate 137. The electrical load resistance $R_L$ 135 is connected between plate 132 and fourth plate 137.

Capacitances 130 and 138, together, have an equivalent series capacitance Cc 237, which may vary over a range between an initial value and 60% of the initial value. The Thévenin equivalent impedance has a positive imaginary component, and a magnitude that is at least three times greater than electrical load resistance $R_L$ 135. Inductor 150 has a reactance approximately equal to a reactance of the initial value of Cc 237.

Figure 9:
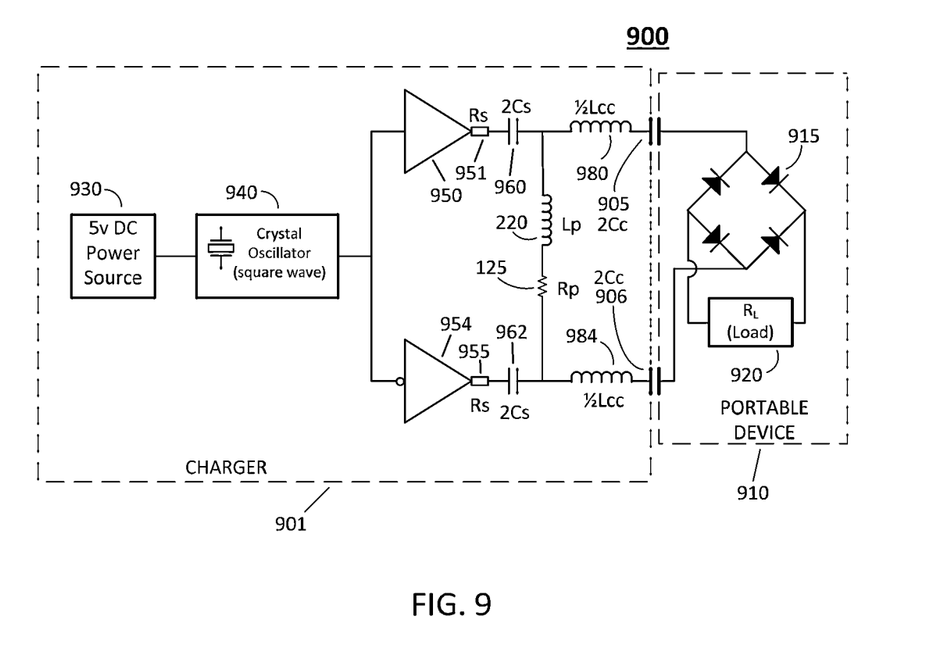
FIG. 9 is a schematic diagram of a system that includes a charger and a portable device having corresponding metal plates that form a capacitive coupling.

FIG. 9 is a schematic diagram of a system 900 that includes a wireless charger 901 and a portable device 910 having corresponding metal plates that form a capacitive coupling. Charger 901 is a balanced push-pull embodiment of the single-ended circuit of FIG. 2, achieving galvanic isolation between charger 901 and portable device 910, for wireless coupling of electric power to a load $R_L$ 920.

In charger 901, AC power source 105 of FIG. 2 is implemented by a 5 volt DC power source 930, an oscillator 940, i.e., a crystal controlled square wave oscillator, and push-pull buffers 950 and 954. Buffer 954 inverts the phase of the output of oscillator 940, and both buffers 950 and 954 feature low output impedances Rs 951 and Rs 955, for example 5 ohms.

Series capacitor Cs 215 is implemented by capacitors 960 and 962, each having doubled capacitance 2Cc. Inductance Lp 220 and loss resistance Rp 125 are implemented in charger 901 as in circuit 200. Inductor Lcc 150 is implemented in charger 901 by inductors 980 and 984, each with a value of ½Lcc.

Series equivalent capacitance Cc 237 is implemented by two coupling capacitances 905 and 906, each with doubled capacitance 2Cc. A bridge rectifier 915 in portable device 910 rectifies alternating current supplied via capacitances 905 and 906.

Figure 10:
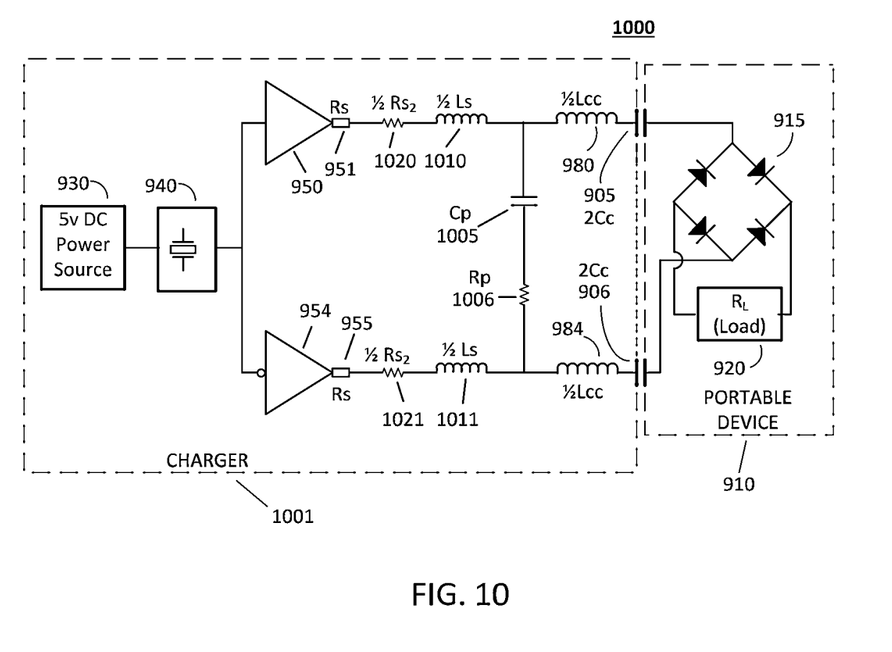
FIG. 10 is a schematic diagram of another system that includes a charger and a portable device having corresponding metal plates that form a capacitive coupling.

FIG. 10 is a schematic diagram of a system 1000 that includes a charger 1001 and portable device 910 having corresponding metal plates that form a capacitive coupling. Charger 1001 is similar to charger 901, but with a capacitive parallel reactance Cp 1005 and loss resistance Rp 1006. Series reactive component 107 is implemented with inductive reactances ½Ls 1010 and 1011, and loss resistances ½$Rs_2$ 1020 and 1021.

Figure 11:
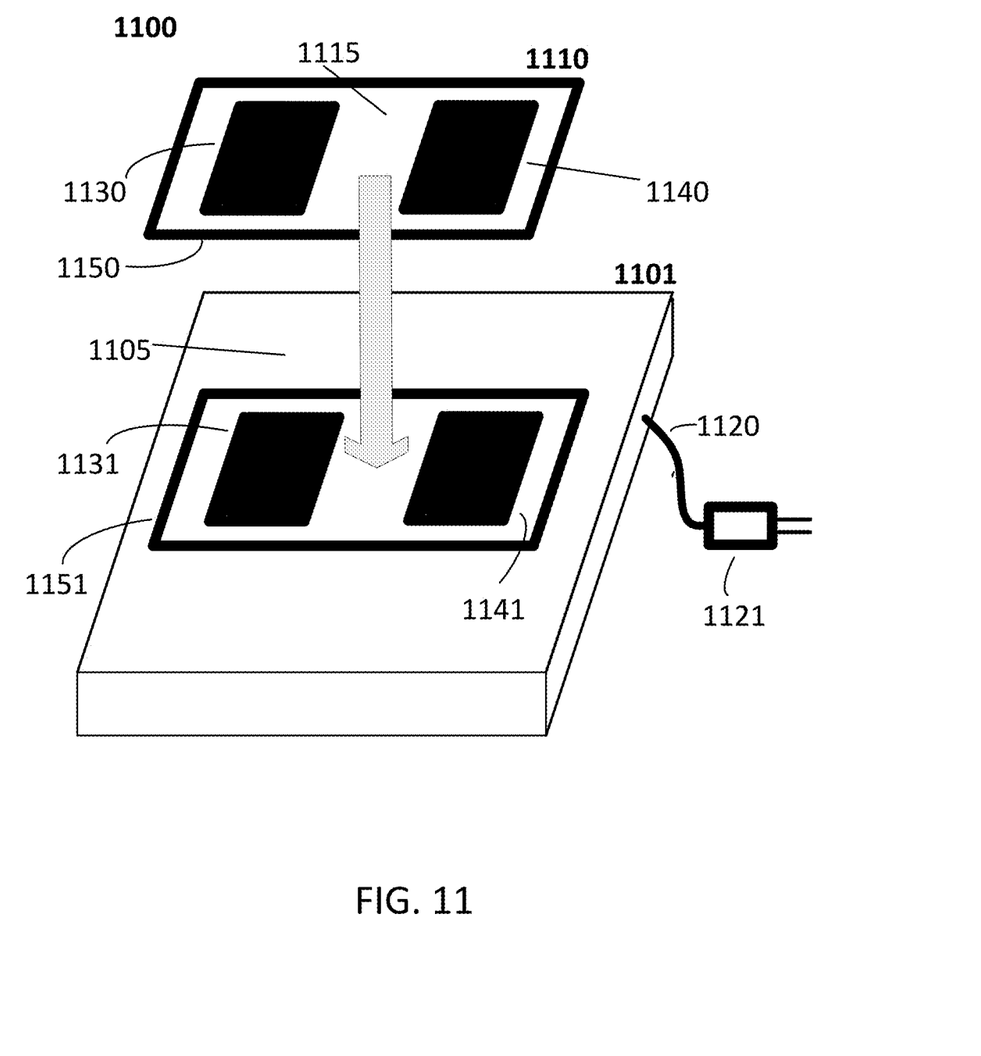
FIG. 11 is an illustration of a physical representation of an embodiment of a system that includes a charger and a portable device having corresponding metal plates that form a capacitive coupling.

FIG. 11 is an illustration of a physical representation of an embodiment of a system 1100 that includes a charger 1101 and a portable device 1110 having corresponding metal plates that form a capacitive coupling. Charger 1101 is powered from electrical mains via a cable 1120 and a plug 1121 plugged into a power outlet (not shown). Charger 1101 has electrically conducting metallic plates 1131 and 1141 on an electrically insulating surface 1105. Portable device 1110 has electrically conducting metallic plates 1130 and 1140 on an external insulating surface 1115. The remainder of portable device 1110 is not shown. Metallic plate 1130 is placed in close proximity and alignment with metallic plate 1131, forming capacitor 905 as shown in FIGS. 9 and 10.

Similarly, metallic plate 1140 is placed in close proximity and alignment with metallic plate 1141, forming capacitor 906. One or both of plate pairs 1130-1140 and 1131-1141 is/are covered with an insulation coating, preventing galvanic connection between the circuits of charger 1101 and portable device 1110. An optional conductive and grounded ring 1150 or 1151 shields the abovementioned plate pairs, and decreases the magnitude of electric field emissions in the vicinity of charger 1101 and portable device 1110.

The techniques described herein are exemplary, and should not be construed as implying any particular limitation on the present disclosure. It should be understood that various alternatives, combinations and modifications could be devised by those skilled in the art. The present disclosure is intended to embrace all such alternatives, modifications and variances that fall within the scope of the appended claims.

The terms "comprises" or "comprising" are to be interpreted as specifying the presence of the stated features, integers, steps or components, but not precluding the presence of one or more other features, integers, steps or components or groups thereof. The terms "a" and "an" are indefinite articles, and as such, do not preclude embodiments having pluralities of articles.

What is claimed is:

1. A system comprising:
    a charger having:
        a source that provides alternating current at a source frequency (fs), and has a first terminal and a second terminal, and a source impedance;
        a first reactive component connected between said first terminal and an interim point;
        a second reactive component connected between said interim point and said second terminal,
            wherein one of said first reactive component and said second reactive component is a capacitor, and the other of said first reactive component and said second reactive component is a first inductor,
            wherein said first reactive component, said second reactive component, and said source impedance, in combination, have a Thévenin equivalent impedance,
            wherein said first inductor and said capacitor have a resonant frequency that is different from said source frequency;
        a first plate that is electrically conductive;
        a second inductor connected between said interim point and said first plate; and
        a second plate that is electrically conductive and is connected to said second terminal; and
    a portable device having:
        a third plate that faces said first plate, wherein said third plate is electrically conductive and thus forms a first capacitance between said third plate and said first plate;
        a fourth plate that faces said second plate, wherein said fourth plate is electrically conductive and thus forms a second capacitance between said second plate and said fourth plate; and
        an electrical load resistance connected between said third plate and fourth plate,
    wherein said first and second capacitances, together, have an equivalent series capacitance,
    wherein said equivalent series capacitance has a value in a range between an initial value and 60% of said initial value,
    wherein said Thévenin equivalent impedance has a positive imaginary component, and a magnitude that is at least three times greater than said load resistance,
    wherein said second inductor has a reactance approximately equal to a reactance of said initial value of said equivalent series capacitance.

2. The system of claim 1, wherein said resonant frequency is within about 5% of said source frequency.

3. The system of claim 1, wherein said charger provides a current to said electrical load resistance that varies less than about 10% over said range of said equivalent series capacitance.

4. The system of claim 1, wherein said portable device contains an energy storage device.

5. The system of claim 1,
    wherein said charger provides a current ($I_L$) to said electrical load resistance,
    wherein said source has a source voltage (Vs),
    wherein said capacitor has a capacitance (Cs) of about $1.11\, I_L/(2\pi fsVs)$, and
    wherein said first inductor has inductance (Lp) of about $0.94/(4\pi^2 f_S^2 Cs)$.

* * * * *